(12) United States Patent
Stringham

(10) Patent No.: US 9,569,313 B1
(45) Date of Patent: Feb. 14, 2017

(54) METHOD AND APPARATUS FOR OPTIMIZING A BACKUP CHAIN USING SYNTHETIC BACKUPS

(71) Applicant: Symantec Corporation, Mountain View, CA (US)

(72) Inventor: Russell R. Stringham, Orem, UT (US)

(73) Assignee: Veritas Technologies LLC, Mountain View, CA (US)

( * ) Notice: Subject to any disclaimer, the term of this patent is extended or adjusted under 35 U.S.C. 154(b) by 0 days.

(21) Appl. No.: 14/605,541

(22) Filed: Jan. 26, 2015

Related U.S. Application Data

(63) Continuation of application No. 12/033,365, filed on Feb. 19, 2008, now Pat. No. 8,943,281.

(51) Int. Cl.
  *G06F 12/16* (2006.01)
  *G06F 11/14* (2006.01)
  *G06F 17/30* (2006.01)

(52) U.S. Cl.
  CPC ....... *G06F 11/1469* (2013.01); *G06F 11/1448* (2013.01); *G06F 17/30876* (2013.01); *G06F 2201/84* (2013.01)

(58) Field of Classification Search
  CPC .......... G06F 11/1446–11/1469; G06F 2201/84
  See application file for complete search history.

(56) References Cited

U.S. PATENT DOCUMENTS

| | | | |
|---|---|---|---|
| 2005/0108486 A1* | 5/2005 | Sandorfi | G06F 11/1448 711/162 |
| 2006/0059384 A1* | 3/2006 | Helliker | G06F 11/1464 714/13 |
| 2007/0088973 A1* | 4/2007 | Passerini | G06F 11/1435 714/6.1 |
| 2008/0016387 A1* | 1/2008 | Bensinger | G06F 11/1456 714/4.11 |
| 2008/0307020 A1* | 12/2008 | Ko | G06F 11/1469 |

OTHER PUBLICATIONS

Quora.com, https://www.quora.com/In-an-arithmetic-progression-can-the-common-difference-be-zero, Published Apr. 28, 2014, Retrieved Sep. 20, 2015.*

* cited by examiner

*Primary Examiner* — Nicholas Simonetti
(74) *Attorney, Agent, or Firm* — Campbell Stephenson LLP

(57) ABSTRACT

A method and apparatus for optimizing a backup chain using synthetic backups is described. In one embodiment, a method for creating synthetic incremental backups to optimize a backup chain comprises accessing a backup chain, which further comprises a plurality of incremental backups and determining schedule information defining a number of incremental backups to use to create one or more synthetic incremental backups representing the plurality of incremental backups from the backup chain, wherein the number of backups is defined by a numerical progression.

20 Claims, 4 Drawing Sheets

METHOD AND APPARATUS FOR OPTIMIZING A BACKUP CHAIN USING SYNTHETIC BACKUPS

CROSS-REFERENCE TO RELATED APPLICATIONS

The present patent application is a continuation of U.S. patent application Ser. No. 12/033,365, filed on Feb. 19, 2008, entitled "Method and Apparatus For Optimizing A Backup Chain Using Synthetic Backups" and is incorporated by reference herein in its entirety and for all purposes as if completely and fully set forth herein

BACKGROUND OF THE INVENTION

Field of the Invention

Embodiments of the present invention generally relate to data protection systems and, more particularly, to a method and apparatus for optimizing a backup chain using synthetic backups.

Description of the Related Art

Recovery from a data loss event normally requires an effective backup process. The backup process is used to create copies or backups of a data storage device, which can be used to restore original file data following the data loss event. The backup process protects against software failures, hardware failures and any other error committed by the user. Software failures are bugs or procedural errors in, for example, a server application that corrupts the contents of file data. Hardware failures can range from the failure of a single hard disk to the destruction of an entire data center, making some or all files of the file data unavailable. Errors committed by the user include errors such as accidental deletion or overwriting of files that are later required. Consequently, in these cases, deleted file data subsequently delay the ability of a user or set of users to use the file data accurately. Conventionally, backup systems use two types of backups: full and incremental.

During a full backup, the system transfers a copy of all the data on one or more storage devices to a backup set comprising one or more backups. During subsequent incremental backups, the backup system copies the data that has changed since either the last full backup or the most recent incremental backup and stores the copies as one or more incremental backups. Differential backups are incremental backups that capture the data that has changed since the last full backup. Some systems implement incremental backups by capturing files that have changed or by identifying changed portions of the files and capturing only the changed file data. Other systems implement incremental backups by capturing the changed file data. Other systems implement incremental backups by capturing changed cluster data of an underlying file system or changed sector data (i.e., format actually used to store the data on a disk).

Currently, certain data protection applications (e.g., Backup Exec System Recovery (BESR)) are configured to generate two kinds of backups, a full or base backup and an incremental backup. For example, the Backup Exec System Recovery (BESR) creates a backup chain comprising an extremely large number of incremental backups based on a full backup. Each incremental backup comprises file data that has been changed since the previous incremental backup or the base backup. The previous incremental backup is considered to be the parent of a current incremental backup. Furthermore, access to each and every previous backup back to the base backup is required in order to assemble a complete backup.

The Backup Exec System Recovery (BESR) creates a synthetic incremental backup from one or more incremental backups (e.g., a collapse or image consolidation). The synthetic incremental backup corresponds to the file data represented by the collapsed one or more incremental backups. The synthetic incremental backup has a parent backup that may be a synthetic incremental or synthetic base backup. The synthetic incremental backup contains the file data that has been modified since a point-in-time captured by the parent backup. However, the collapse does not change the base or full backup. The base backup can be combined with a portion of the following incremental backups in the backup chain to create a synthetic base backup. The synthetic base backup captures the same set of data as would have been captured had a full backup been created at the point-in-time that the last incremental backup that was rolled up into the synthetic base backup was created. The rolling up of the base backup reads all the data in a targeted point-in-time including the data that has not changed, since the original base backup was taken. Such backup processing requires a commitment of substantial computing resources. Within a computer network comprising at least one server and a plurality of client computers, rolling up and collapsing can strain a client computer's resources as well as the network/processing resources and the like of the overall system. However, often at some point of time, the administrator no longer needs the incremental backups. For example, while the backup process may be performed every fifteen minutes, if the user wanted to restore data from two weeks ago, any backup from two weeks ago is most likely sufficient and access to any other backup at the fifteen minute resolution is not needed as long as the accessed backup is complete. A synthetic incremental backup can be created to represent (e.g., convert) ninety-six incremental backups (i.e., four incremental backups per hour for twenty-four hours equals ninety-six incremental backups).

Moreover, a long backup chain generated by the Backup Exec System Recovery (BESR) strains the resources of the overall system because more storage space and processing power is required to restore the data for each and every previous incremental backup back to the base backup in order to assemble the complete backup. Furthermore, restoring data from the long backup chain requires opening all of the backups in the chain, calculating the location of each sector and reading the necessary sectors to locate the correct incremental file data which is required by the user. Subsequently to execute the calculation, each backup in the chain requires some memory to hold a bitmap indicating which sectors are actually present in the chain. Even with significant memory optimization to the bitmap structure the Backup Exec System Recovery (BESR) is not able to support backup chains longer than a few thousand incremental backups, when working with large volumes (e.g., 100 GB or greater). Furthermore, if the backup chain is located across a slow network connection such as a virtual private network (VPN), the cost of opening and reading from many file data can be prohibitive.

Therefore, there is a need in the art for a method and apparatus for processing a backup chain using synthetic backups (e.g., synthetic incremental backups) to optimize the backup chain in an efficient and cost effective manner.

SUMMARY OF THE INVENTION

Embodiments of the present disclosure generally comprise a method and apparatus for optimizing a backup chain using synthetic backups. In one embodiment, a method for creating synthetic incremental backups to optimize a backup chain comprises accessing a backup chain, which further comprises a plurality of incremental backups and determining schedule information defining a number of incremental backups to use to create one or more synthetic incremental backups representing the plurality of incremental backups from the backup chain, wherein the number of backups is defined by a numerical progression.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
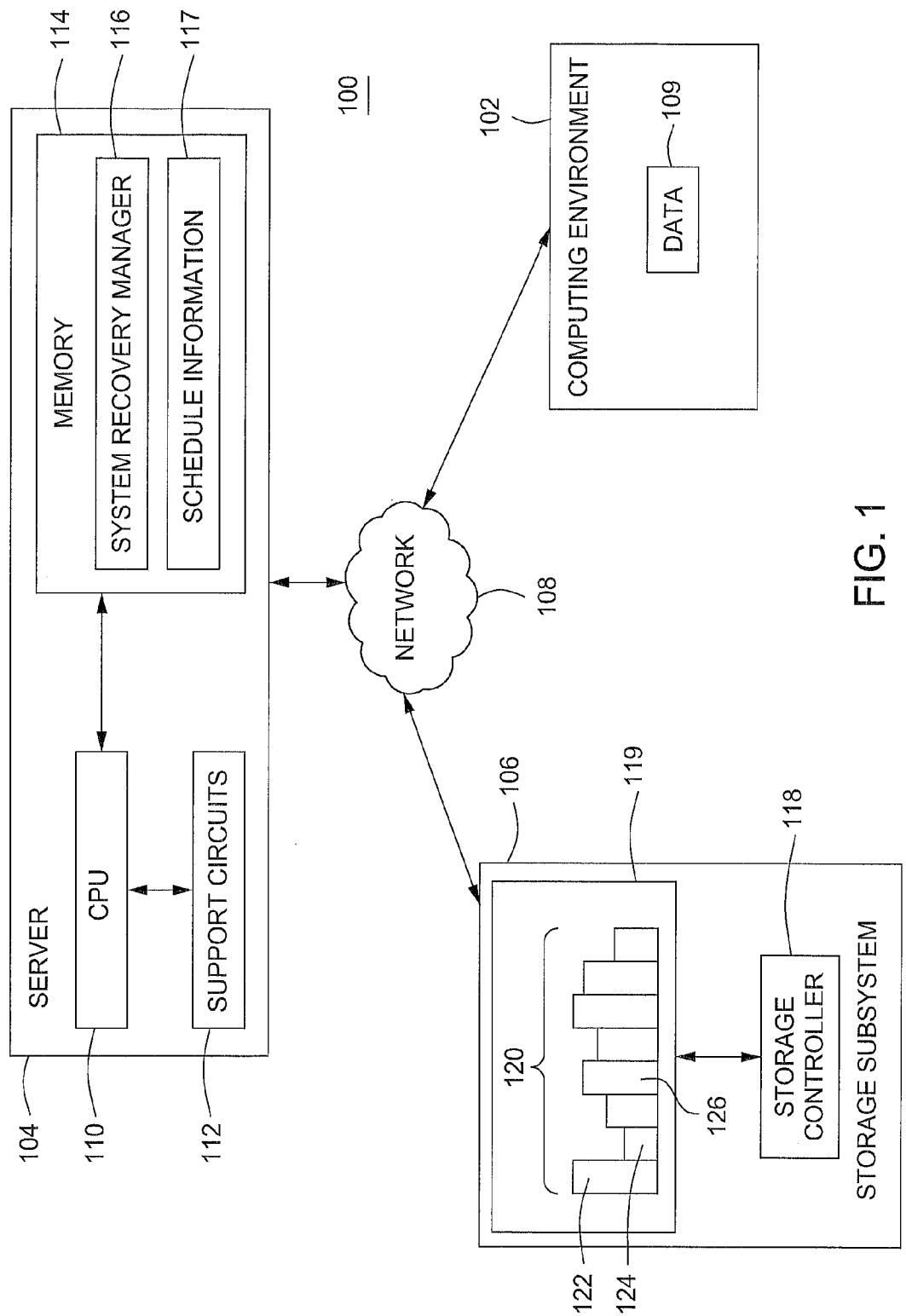
FIG. 1 is a block diagram depicting a system for optimizing a backup chain using synthetic incremental backups according to one embodiment of the present invention.

FIG. 1 depicts a system 100 for processing a backup chain 120, according to one embodiment of the present invention. The system 100 comprises a computing environment 102, a server 104, and a storage subsystem 106, each coupled to one another through a network 108.

The computing environment 102 refers to one or more systems, resources and/or devices, such as one or more software applications, servers, client computers, volumes, mobile computing devices (e.g., cell phones and personal digital assistants (PDAs)), storage devices, peripherals, networks, and the like. The computing environment 102 comprises data 109, which may be stored as a volume according to one embodiment.

Generally, the server 104 is designed to manage the backup and/or recovery of the data 109 stored within the computing environment 102. The server 104 comprises a Central Processing Unit (CPU) 110, various support circuits 112 and a memory 114. The memory 114 includes various software packages, such as a system recovery manager 116. The memory further includes various data, such as schedule information 117. As described further below, the schedule information 117 comprises a schedule for creating synthetic incremental backups.

Generally, the storage subsystem 106 comprises a collection of data storage technologies (e.g., tape library, ATA disk arrays, Fibre Channel disk arrays, ISCSI (Internet SCSI) block devices and the like). The storage subsystem 106 comprises a storage controller 118. The storage controller 118 is configured to process one or more backup files (e.g., incremental backups, base backups and the like). The storage subsystem 106 further comprises one or more backup sets 119, which includes a backup chain 120. Moreover, the backup chain 120 comprises a plurality of backup files representing full and/or incremental backups of the data 109. In one embodiment, the backup chain 120 comprises a base backup 122, one or more incremental backups (e.g., an incremental backup 124) and one or more synthetic incremental backups (e.g., a synthetic incremental backup 126).

The network 108 comprises a communication system that connects a computer system by wire, cable, fiber optic, and/or wireless links facilitated by various types of well-known network elements, such as hubs, switches, routers, and the like. The network 108 may employ various well-known protocols to communicate information amongst the network resources. For example, the network 108 may be part of the Internet or intranet using various communications infrastructure such as Ethernet, WiFi, WiMax, General Packet Radio Service (GPRS), and the like.

The system recovery manager 116 and the storage controller 118 cooperate to optimize the backup chain 120. Specifically, the system recovery manager 116 and the storage controller 118 cooperate to optimize a plurality of backup chains within the backup chain 120 where the plurality of backup chains are rooted in the base backup 122. For example, the system recovery manager 116 and the storage controller 118 are configured to control a length (e.g., a maximum number of backups and/or an average number of backups) of the backup chain 120. In one embodiment, the system recovery manager 116 optimizes the backup chain 120 such that the length of the backup chain 120 progresses logarithmically.

In operation, the system recovery manager 116 determines the schedule information 117, which defines a number of incremental backups to use to create the synthetic incremental backup 126. For example, the synthetic incremental backup 126 is created to represent data stored within one or more consecutive incremental backups (e.g., one or more previous incremental backups, such as the incremental backups back through the incremental backup 124). Accordingly, the synthetic incremental backup 126 may be utilized in a data recovery process instead of all of the incremental backups from the incremental backup 124 through an original incremental backup that is associated with a same point-in-time as the synthetic incremental backup 126 to reduce a number of backup files to be opened and restored during the data recovery process. For example, if the synthetic incremental backup 126 represents data backed up during three incremental backups of the data 109, the data recovery process would only have to open and process one backup file (i.e., the synthetic incremental backup) instead of three backup files to recover the same data.

In another embodiment, the system recovery manager 116 and the storage controller 118 are configured to optimize (e.g., reduce) the length of the backup chain 120 and/or the size of the backup set 119. For example, the incremental backup 124 as well as any descendents of the incremental backup 124 are deleted by the storage controller 118 to free up storage space and reduce the size of the backup set 119. As another example, the synthetic incremental backup 126 and the base backup 122 are combined into a synthetic base backup and the synthetic incremental backup 126 is deleted after a period of time elapses, which reduces the length of the backup chain 120 by one. For example, the synthetic incremental backup 126 may comprise data that is no longer needed by the computing environment 102 because it is too old and/or otherwise useless. In another embodiment, the schedule information 117 comprises a schedule for pruning the backup chain 120. For example, the schedule information 117 indicates which incremental backups and/or synthetic incremental backups in the backup chain 120 to delete.

In some embodiments, the backup chain 120 must be broken in order to delete the synthetic incremental backup 126 or the incremental backup 124, unless either backup is at the end of the backup chain 120 or one or more backups (e.g., another synthetic incremental backup and/or one or more incremental backups) cover a same time period as the synthetic incremental backup 126 and/or the incremental backup 124.

The system recovery manager 116 creates the incremental backup 124 during a backup process performed on the data 109 stored within the computing environment 102 and stores the incremental backup 124 in the backup chain 120, which is maintained by the storage subsystem 106. As mentioned above, the base backup 122 and the incremental backup 124 form a portion of the backup chain 120. In one embodiment, the system recovery manager 116 accesses the backup chain 120 and determines the schedule information 117 for the creation of one or more synthetic incremental backups (e.g., the synthetic incremental backup 126) from two or more incremental backups in the backup chain 120. Accordingly, the storage controller 118 and/or the system recovery manager 116 process two or more incremental backups to create the synthetic incremental backup 126 in accordance with the schedule information 117.

In one embodiment, based on the schedule information 117, the system recovery manager 116 consolidates (e.g., collapses) the two or more incremental backups into the synthetic incremental backup 126. The system recovery manager 116 utilizes the storage controller 118 to examine the two or more incremental backups for data that has been modified since the parent backup, such as the base backup 122, a previous synthetic incremental backup or a previous incremental backup. Then, the system recovery manager 116 utilizes the storage controller 118 to create the synthetic incremental backup 126 to represent the data that has been modified since a particular parent backup that corresponds to a particular point in time.

The schedule information 117 defines various values for $N_1, N_2, N_3 \ldots N_M$ where $N_i$ represents a number of backups at an iteration i (e.g., incremental backups or synthetic incremental backups) to use to create a synthetic incremental backup. In one or more embodiments, the storage controller 118 and/or the system recovery manager 116 convert every $N_1^{th}$ incremental backup into a first synthetic incremental backup. As such, each first synthetic incremental backup represents the previous $N_1$ incremental backups in the backup chain 120. Furthermore, a length of the backup chain 120 at each first synthetic incremental backup is one more than a length of a previous first synthetic incremental backup. Hence, a length of the backup chain 120 increases by one for every $N_1$ incremental backups used to create the first synthetic incremental backup. Every incremental backup that is added to the backup chain 120 increases the length of the backup chain 120 by one until $N_1$ incremental backups have been added, which prompts the creation of the first synthetic incremental backup and reduces the length of the backup chain 120 to one more than a length of the backup chain 120 at the previous first synthetic incremental.

In one embodiment, every $N_2^{th}$ first synthetic incremental backup in the backup chain 120 is converted into a second synthetic incremental backup, which represents the previous $N_2$ first synthetic incremental backups (i.e., the previous $N_1*N_2$ incremental backups) in the backup chain 120. Then, in yet another embodiment, every $N_3^{th}$ second synthetic incremental backup is converted into a third synthetic incremental backup to represent the previous $N_3$ second synthetic incremental backups (i.e., the previous $N_1*N_2*N_3$ incremental backups) in the backup chain 120. In other embodiments, a number of synthetic incremental backups in the backup chain 120 are converted into larger synthetic incremental backups until no more synthetic incremental backups may be generated.

Consequently, the schedule information 117 (i.e., various values for $N_1, N_2, N_3 \ldots N_M$) may define a numerical progression (e.g., logarithmic progression, exponential progression, arithmetic progression, geometric progression and the like including any combination thereof) associated with the backup chain 120. For example, if $N_1=N_2=N_3$, then a number of incremental backups used to create the first synthetic incremental backup, the second synthetic incremental backup and the third synthetic incremental backup may form a geometric progression since $N_1$ is multiplied by a common factor (i.e., $N_1$) at each iteration or an exponential progression since the number of incremental backups used at each iteration increases exponentially (i.e., $N_1^1$, $N_1^2$, $N_1^3$ and so on).

In another embodiment, if $N_1, N_2, N_3 \ldots N_M$ are not the same values, then the number of incremental backups used at each iteration may form more than one geometric progression due to a lack of a common factor. In addition, a length of the backup chain 120 (e.g., at any point-in-time) for each iteration form a logarithmic progression. For example, before the creation of the first synthetic incremental backup, a length of the backup chain 120 was a total number of incremental backups in the backup chain 120. Before the creation of the second synthetic incremental backup, a length of the backup chain 120 was the logarithm of the total number of incremental backups. Accordingly, before the creation of the third synthetic incremental backup, a length of the backup chain 120 was the logarithm of the length of the backup chain 120 before the creation of the second synthetic incremental backup. As explained below, values for $N_1, N_2, N_3 \ldots N_M$ may change (e.g., adjustment in frequencies of the creation of synthetic incremental backups) as the total number of incremental backups increases.

In one embodiment where a length of the backup chain 120 at a particular (e.g., latest or most recent) point-in-time is twenty-seven incremental backups and $N_1=N_2=N_3=3$, every three incremental backups are used to create each $N_1^{th}$ synthetic incremental backup, every nine incremental backups are used to create each $N_2^{th}$ synthetic incremental backup and all twenty-seven incremental backups are used to create each $N_3^{th}$ synthetic incremental backup. Furthermore, the length of the backup chain 120 at the particular point-in-time decreases from twenty-seven to nine after every three incremental backups are used to create each $N_1^{th}$ synthetic incremental backup. Then, the length of the backup chain 120 at the particular point-in-time decreases from nine to three after the creation of each $N_2^{th}$ synthetic incremental backup. Finally, the length of the backup chain 120 at the particular point-in-time decreases to one because the $N_3^{th}$ synthetic incremental backup represents all twenty-seven incremental backups.

Figure 2:
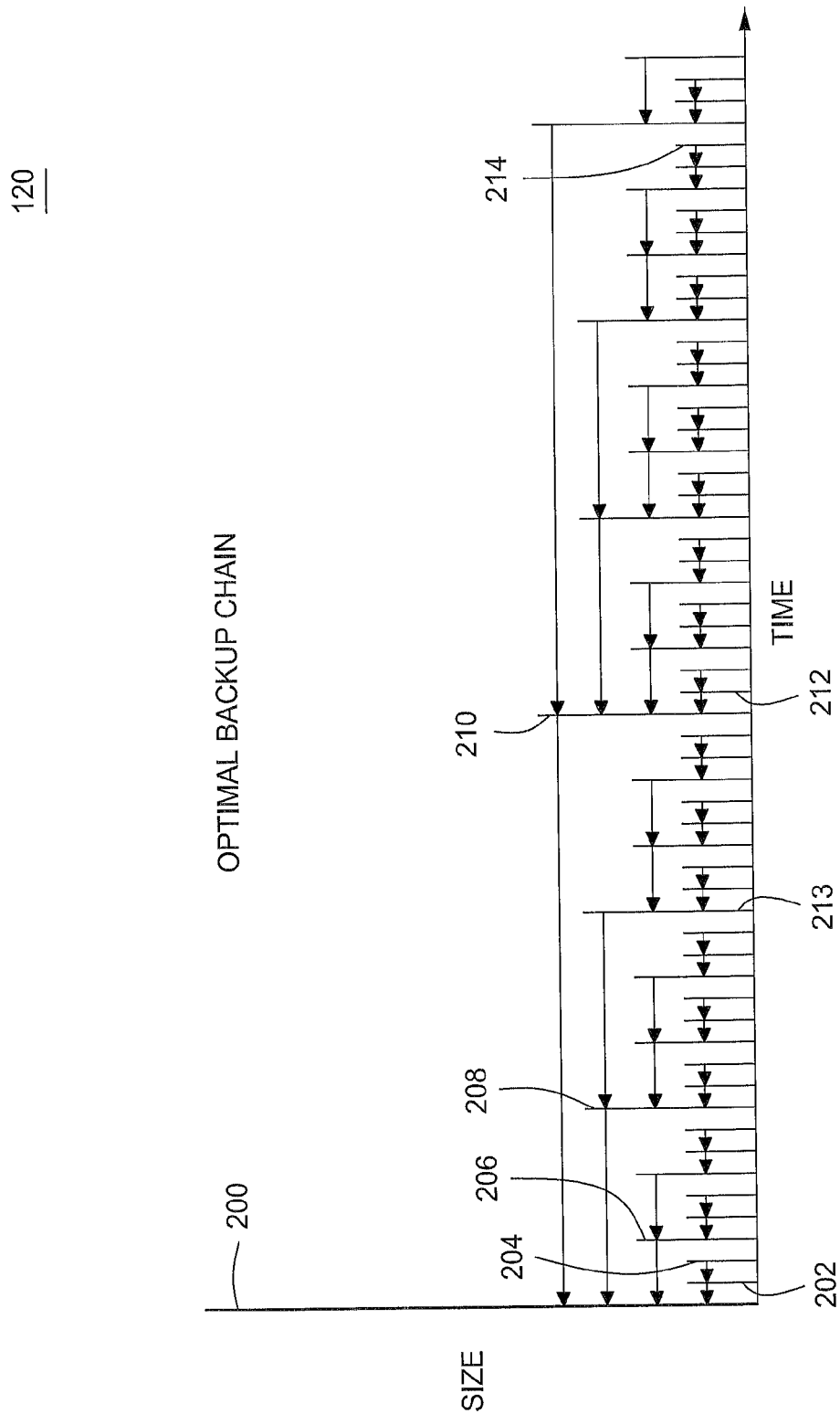
FIG. 2 is an illustration of an optimal backup chain according to one embodiment of the present invention.

FIG. 2 is an illustration of the backup chain 120 according to one embodiment of the present invention. In particular, the backup chain 120 is an optimal backup chain where $N_1=N_2=N_3=3$ (i.e., a synthetic incremental backup is scheduled for creation for every third incremental backup).

The X-axis represents time progressing forward where a base backup 200 (e.g., the base backup 122) is at one end (e.g., beginning) of any chain within the backup chain 120.

Each backup points to a parent backup. As mentioned above, each incremental backup comprises data that has been modified since the parent backup. For example, the base backup 200 is a parent backup for an incremental backup 202. Accordingly, the incremental backup 202 points to the base backup 200. Accordingly, a length of the backup chain 120 at a particular point-in-time is a number of parent backups between an incremental backup associated with the particular point-in-time and the base backup 200. For example, the length of the backup chain 120 at the incremental backup 202 is one, as illustrated in FIG. 2. As such, the length of the backup chain 120 at an incremental backup 204 is two because the incremental backup 202 is a parent backup for the incremental backup 204.

The Y-axis represents a size of an individual backup in the backup chain 120 where a larger backup is illustrated as a longer line. For example, the incremental backup 202 and the incremental backup 204 are relatively the same size because the incremental backup 202 and the incremental backup 204 are associated with only one incremental backup. Accordingly, the incremental backup 202 and the incremental backup 204 are illustrated as lines of equivalent length. A synthetic incremental backup 206, however, is larger in size than the incremental backup 204 because it is illustrated as a longer line. In fact, the synthetic incremental backup 206 comprises data that has been modified since the base backup 200, which includes the data stored in the incremental backup 204 and the incremental backup 202.

In one embodiment, the schedule information 117 associated with the backup chain 120 indicates that every $N_1*N_2^{th}$ incremental backup is converted into a synthetic incremental backup that comprises data (e.g., file data) that has been modified since the base backup 200 or a previous $N_1*N_2^{th}$ incremental (i.e., a previous synthetic incremental backup). Accordingly, the $N_1*N_2^{th}$ incremental backup has the previous $N_1*N_2^{th}$ incremental as a parent backup. Moreover, every $N_1*N_2*N_3^{th}$ incremental backup is converted into a synthetic incremental backup that comprises data that has been modified since the previous $N_1*N_2*N_3^{th}$ incremental backup.

The backup chain 120 is optimal because the length (e.g., a maximum length) progresses logarithmically. As such, each time a total number of incremental backups increases by a factor of three ($N_1$), the maximum length of the backup chain 120 from any incremental backup back to the base backup 200 only increases by two ($N_1-1$). In one embodiment, the backup chain 120 forms a tree-like configuration such that the length of the backup chain 120 increases logarithmically based on the number of maximum children incremental backups for a parent synthetic incremental backup. For example, backup 214 is an incremental backup with a longest chain in the backup chain 120. Here, a portion of the backup chain 120 starting with the backup 214 comprises seven backups that lead back to the base backup 200, which is at most two backups more than the maximum length of any portion (e.g., chain) within the backup chain 120 at any point-in-time up through a synthetic incremental backup 213 even though a number of points-in-time (e.g., incremental backups) since the incremental backup 213 has increased by about a factor of three (i.e., tripled). Hence, as the total number of incremental backups in the backup chain 120 increases by a factor of $N_1$, a maximum length of any portion of the backup chain 120 increases by only $N_1-1$ (i.e., assuming $N_1=N_2=N_3=\ldots=N_M$).

According to yet another embodiment of the present invention, $N_1, N_2, N_3 \ldots N_M$ are assigned optimal values. Such optimal values may depend upon a cost of creating a synthetic incremental backup in comparison to a cost of an increased length of the backup chain 120. The cost of creating the synthetic incremental backups in turn is affected by an average size of each incremental backup. The cost of creating the synthetic incremental backups also depends on whether most of the changes performed are modifications of existing data or newly added data. In one embodiment, the optimal values of $N_1, N_2,$ and $N_3 \ldots N_M$ are assigned based on resource parameters. Larger values of $N_1, N_2,$ and $N_3 \ldots N_M$ will consequently result in longer average chain lengths, but will require fewer resources to create and store the synthetic incremental backups. By using optimal values for $N_1, N_2, N_3 \ldots N_M$, the total number of incremental backups increases but the average length of the backup chain 120 does not increase proportionately (i.e., increases at a substantially slower rate).

According to yet another embodiment of the present invention, a frequency of synthetic incremental backup creation near the beginning of the backup chain 120 is reduced and a frequency of synthetic incremental backup creation is increased near the end of the backup chain 120 since the average length of the backup chain 120 near the beginning may be much shorter than average length near the end. When the frequencies of synthetic incremental backup creation are reduced at the beginning, a longer length of the backup chain 120 is achieved.

For example, an optimal value of $N_1$ can be ten for the first one hundred incremental backups, followed by an optimal value of nine for $N_1$ for the next two hundred incremental backups, which is then followed by an optimal value of eight for $N_1$ for the next four hundred incremental backups and so on. Here, the optimal values of $N_1$ depend upon selecting a large starting optimal value for $N_1$ and an acceptable maximum chain length. The optimal value for $N_1$ is used until the maximum chain length is surpassed. Then, the optimal value of $N_1$ is reduced by one and continued until the maximum chain length is again surpassed and/or the optimal value of $N_1$ reaches a smallest acceptable optimal value. Ultimately, a point is reached where either the backup chain 120 length will become too long or the largest synthetic incremental backups will become too large and costly to create. At that time, a synthetic base backup is created.

According to one or more embodiments of the present invention, the schedule information 117 comprises a scheduling function f. In one embodiment, f may be expressed as $f_1(x), f_2(x), f_3(x), f_i(x) \ldots f_M(x)$, where M is any integer greater than two and x is the number of incremental backups to the base backup 122. The function $f_i(x)$ returns TRUE if a synthetic incremental backup at iteration i should be created to represent at least a portion of the x incremental backups. In the case where $N_1=N_2=N_3=\ldots=N_M$, $f_1(x)=(x \bmod N_1==0)$, $f_2(x)=(x \bmod (N_1*N_2)==0)$ and so on for the values $N_3 \ldots N_M$. For iteration i, $f_i(x)$ returns TRUE for more than one value of x. In another embodiment, a second function g(x) returns TRUE when a synthetic base backup should be created. If g(x) returns TRUE, x is reset to zero and $f_i(x)$ continues down the backup chain 120. If $f_y(x)$ and $f_z(x)$ return TRUE where y<z, then the synthetic incremental backup that is created is the one specified by $f_z(i)$. A parent backup of a synthetic backup (e.g., a synthetic incremental backup, a synthetic differential backup, a synthetic base backup and the like) determined by $f_y(x)$ is the most recent synthetic backup determined by $f_z(x)$, where z>=y or the base backup 122 if no such previous synthetic backup exists.

In another embodiment, a function $h_i(x, j)$ describes when a particular incremental backup should be deleted, where x is the incremental backup to be deleted and j is the index of a most recently created incremental backup. In other embodiments, f may include additional parameters, for example, a function $f_i(x, v)$ where x is the number of the incremental backups under consideration and v is the total number of incremental backups that have been created for the backup chain 120. In one or more instances, a synthetic backup (e.g., a synthetic incremental backup, a synthetic differential backup, a synthetic base backup and the like) is not immediately created even though $f_i(x)$ returns TRUE. Instead, the creation of the synthetic incremental is delayed until a number of additional incremental backups have been created.

Figure 3:
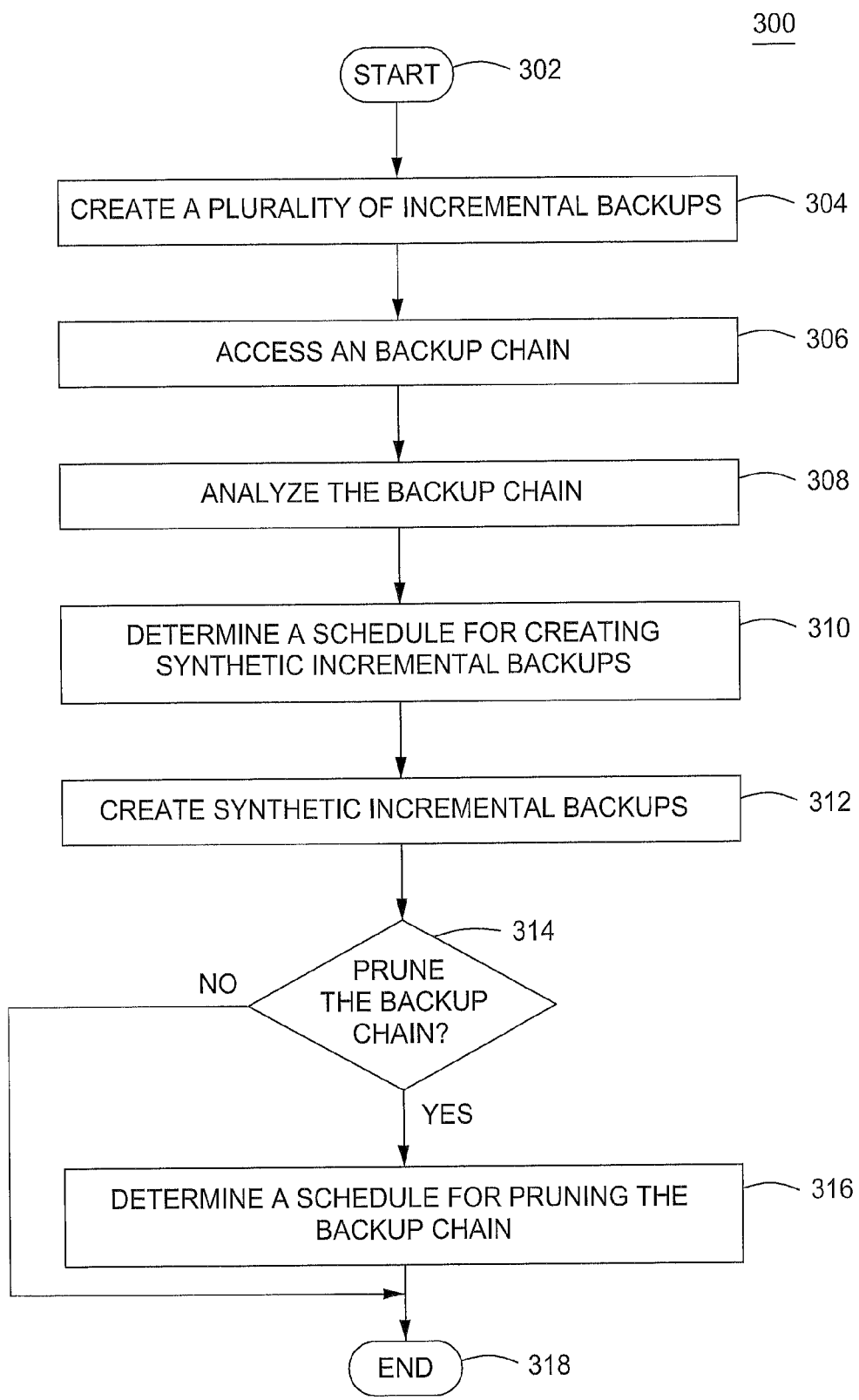
FIG. 3 is a flow diagram depicting a method for optimizing a backup chain using synthetic incremental backups according to one embodiment of the present invention.

FIG. 3 depicts a method 300 for processing a backup chain according to an embodiment of the present invention. The method 300 begins at step 302 and proceeds to step 304. At step 304, a plurality of incremental backups (e.g., the incremental backup 124 of FIG. 1) is created by a system recovery manager (e.g., the system recovery manager 116 of FIG. 1) for data stored within a computing environment (e.g., the computing environment 102 of FIG. 1).

At step 306, the backup chain is accessed by the system recovery manager (e.g., the system recovery manager 116 of FIG. 1). At step 308, the backup chain is analyzed by the system recovery manager (e.g., the system recovery manager 116 of FIG. 1). At step 310, a schedule (e.g., the schedule information 117 of FIG. 1) for creating one or more synthetic incremental backups for the backup chain is determined. In one embodiment, the schedule defines a number (e.g., a plurality of numbers) of incremental backups to use to create the one or more synthetic incremental backups, which represents the plurality of incremental backups from the backup chain. For example, the schedule (e.g., the schedule information 117 of FIG. 1) indicates that the synthetic incremental backup is to be created from the two or more incremental backups in the backup chain. Accordingly, two or more incremental backups are used (e.g., collapsed or combined by the system recovery manager 116 of FIG. 1) to create the synthetic incremental backup. As another example, the schedule may indicate that every third incremental backup in the backup chain is to be converted into the synthetic incremental backup.

At step 312, one or more synthetic incremental backups are created in accordance with the schedule. In one embodiment, the system recovery manager 116 creates the synthetic incremental backup and then, communicates the synthetic incremental backup to the storage controller 118 for incorporation into the backup chain 120 as an appropriate point in time. In another embodiment, the system recovery manager 116 uses the storage controller 118 to process one or more incremental backups to create the synthetic incremental backup. In yet another embodiment, the system recovery manager 116 uses the storage controller 118 to convert an incremental backup into a synthetic incremental backup.

At step 314, a determination is made as to whether the backup chain is to be pruned. If the backup chain is to be pruned (option "YES"), the method 300 proceeds to step 316. At step 316, schedule information is determined for pruning the backup chain. The schedule information for pruning the backup chain or the schedule for creating the one or more synthetic incremental backups is optimal based on one or more resource parameters, as described above. At this point, one or more incremental backups or synthetic incremental backups in the backup chain may be pruned in accordance with the schedule information for pruning the backup chain as determined in step 316.

In one embodiment of the present invention, an old incremental backup and/or an old synthetic incremental backup in the backup chain 120 can be pruned or deleted after a defined period of time elapses (e.g., when the old incremental backup and/or the old synthetic incremental backup are no longer useful). For example, after the creation of the synthetic incremental backup 126, the two or more previous incremental backups 126 may be deleted because the modified file data is represented by the synthetic incremental backup 126. At step 314, however, if the backup chain 120 is not to be pruned (option "NO"), the method 300 proceeds to step 318. At step 318, the method 300 ends.

In one embodiment of the present invention, an incremental backup is created every five minutes. Ten five-minute incremental backups are then combined into an hourly synthetic incremental backup. Next, twenty four hourly synthetic incremental backups are combined to produce a daily synthetic incremental backup. Then, seven daily synthetic incremental backups are combined to produce a weekly synthetic incremental backup. Next, four weekly synthetic incremental backups are combined or collapsed to produce a (lunar) monthly synthetic incremental backup. Finally thirteen monthly incremental backups are combined to produce a yearly synthetic incremental backup. In this embodiment, $N_1=10$, $N_2=24$, $N_3=7$, $N_4=4$ and $N_5=13$. Pruning or deleting any of the synthetic incremental backups or the incremental backups is performed after the creation of each synthetic backup. After the hourly synthetic incremental backup is created, each and every 5-minute incremental backup older than four hours is deleted. After the daily incremental backup is created, each and every hourly incremental backup older than two days is deleted. After the weekly incremental backup is created, each and every daily incremental backup older than one week is deleted. After the monthly synthetic incremental backup is created, each and every weekly incremental backup older than three months is deleted. Moreover, the monthly incremental backup and the yearly incremental backup are never deleted.

Figure 4:
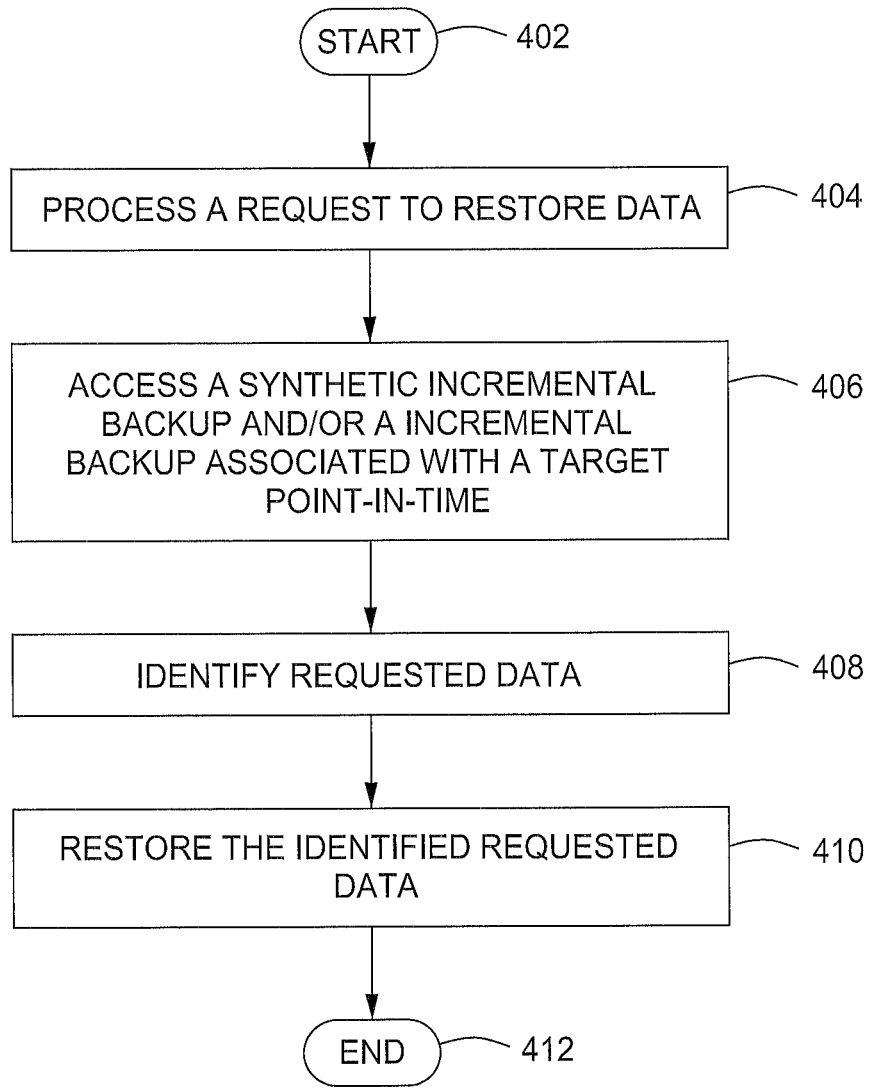
FIG. 4 is a flow diagram depicting a method for restoring data from the backup chain, according to one embodiment of the present invention.

FIG. 4 depicts a method 400 for restoring data from the backup chain 120, according to an embodiment of the present invention. The method 400 begins at step 402 and proceeds to step 404. At step 404, a request to restore data is processed by a server (e.g., the server 104 of FIG. 1) within a computing environment (e.g., the computing environment 102 of FIG. 1) by a system recovery manager (e.g., the system recovery manager 116 of FIG. 1). At step 406, a synthetic incremental backup (e.g., the synthetic incremental backup 126 of FIG. 1) and/or an incremental backup (e.g., the incremental backup 124 of FIG. 1) associated with a target point-in-time is accessed by the system recovery manager (e.g., the system recovery manager 116 of FIG. 1). At step 408, the requested data is identified. At step 410, the identified requested data is restored by the system recovery manager. At step 412, the method 400 ends.

While the foregoing is directed to embodiments of the present invention, other and further embodiments of the invention may be devised without departing from the basic scope thereof, and the scope thereof is determined by the claims that follow.

What is claimed is:

1. A method comprising:
   receiving a request to perform a restore operation, wherein
   the request specifies a requested version of requested data that has been modified at least twice since a base backup was captured;
   accessing, in response to the receiving the request, a synthetic incremental backup of a plurality of first synthetic incremental backups in a backup chain, wherein the backup chain comprises the base backup and the plurality of first synthetic incremental backups,
   the synthetic incremental backup is created using N incremental backups in the backup chain,
   the synthetic incremental backup comprises at least a previous version of the requested data and a modified version of the requested data,
   N is a pre-specified value that determines how many incremental backups are created between creation of each of the plurality of first synthetic incremental backups, and
   each of the plurality of first synthetic incremental backups is created in response to the creation of the respective N incremental backups in the backup chain;
   identifying the requested version of the requested data, wherein
   the requested version of the requested data is capable of being either the previous version or the modified version of the requested data; and
   restoring the requested version of the requested data.

2. The method of claim 1, further comprising:
   creating a synthetic base backup from a previously-created synthetic incremental backup and the base backup, wherein
   the synthetic base backup is created in response to either a length of the backup chain or a size of one or more previously-created synthetic incremental backups.

3. The method of claim 1, wherein
   N is inversely proportional to an average length of the backup chain.

4. The method of claim 1, wherein
   N is defined by a numerical progression, and
   the numerical progression comprises at least one of a logarithmic progression, an exponential progression, or a geometric progression.

5. The method of claim 1, further comprising:
   adjusting N in response to detecting a creation of M incremental backups.

6. The method of claim 1, further comprising:
   creating at least one second synthetic incremental backup from at least two of the plurality of first synthetic incremental backups, wherein
   the at least one second synthetic incremental backup is created in response to the creation of the at least two of the plurality of first synthetic incremental backups.

7. The method of claim 1, further comprising:
   deleting at least one incremental backup of the plurality of first synthetic incremental backups after the creation of a first synthetic incremental backup of the plurality of first synthetic incremental backups, wherein
   the at least one incremental backup was used to create the first synthetic incremental backup.

8. The method of claim 1, further comprising:
   deleting the synthetic incremental backup after a defined period of time elapses subsequent to creating the synthetic incremental backup.

9. An apparatus, comprising:
   a storage subsystem storing backup chain comprising a base backup and a plurality of first synthetic incremental backups; and
   a storage controller configured to:
   receive a request to perform a restore operation, wherein
   the request specifies a requested version of requested data that has been modified at least twice since the base backup was captured,
   access, in response to receiving the request, a synthetic incremental backup of the plurality of first synthetic incremental backups, wherein
   the synthetic incremental backup is created using N incremental backups in the backup chain,
   the synthetic incremental backup comprises at least a previous version of the requested data and a modified version of the requested data,
   N is a pre-specified value that determines how many incremental backups are created between creation of each of the plurality of first synthetic incremental backups, and
   each of the plurality of first synthetic incremental backups is created in response to the creation of the respective N incremental backups in the backup chain,
   identify the requested version of the requested data, wherein
   the requested version of the requested data is capable of being either the previous version or the modified version of the requested data, and
   restore the requested version of the requested data.

10. The apparatus of claim 9, wherein the storage controller is further configured to:
    create a synthetic base backup from a previously-created synthetic incremental backup and the base backup, wherein
    the synthetic base backup is created in response to either a length of the backup chain or a size of one or more previously-created synthetic incremental backups.

11. The apparatus of claim 9, wherein
    N is defined by a numerical progression, and
    the numerical progression comprises at least one of a logarithmic progression, an exponential progression, or a geometric progression.

12. The apparatus of claim 9, wherein the storage controller is further configured to:
    adjust N in response to detecting a creation of M incremental backups.

13. The apparatus of claim 9, wherein the storage controller is further configured to:
    create at least one second synthetic incremental backup from at least two of the plurality of first synthetic incremental backups, wherein
    the at least one second synthetic incremental backup is created in response to the creation of the at least two of the plurality of first synthetic incremental backups.

14. The apparatus of claim 9, wherein the storage controller is further configured to:
    delete at least one incremental backup of the plurality of first synthetic incremental backups after the creation of a first synthetic incremental backup of the plurality of first synthetic incremental backups, wherein
the at least one incremental backup was used to create the first synthetic incremental backup.

15. A system, comprising:
a server for managing backups of data within a computing environment, comprising:
a storage subsystem storing backup chain comprising a base backup and a plurality of first synthetic incremental backups; and
a storage controller configured to:
receive a request to perform a restore operation, wherein
the request specifies a requested version of requested data that has been modified at least twice since the base backup was captured,
access, in response to receiving the request, a synthetic incremental backup of the plurality of first synthetic incremental backups, wherein
the synthetic incremental backup is created using N incremental backups in the backup chain,
the synthetic incremental backup comprises at least a previous version of the requested data and a modified version of the requested data,
N is a pre-specified value that determines how many incremental backups are created between creation of each of the plurality of first synthetic incremental backups, and
each of the plurality of first synthetic incremental backups is created in response to the creation of the respective N incremental backups in the backup chain,
identify the requested version of the requested data, wherein
the requested version of the requested data is capable of being either the previous version or the modified version of the requested data, and
restore the requested version of the requested data.

16. The system of claim 15, wherein the storage controller is further configured to:
create a synthetic base backup from a previously-created synthetic incremental backup and the base backup, wherein
the synthetic base backup is created in response to either a length of the backup chain or a size of one or more previously-created synthetic incremental backups.

17. The system of claim 15, wherein
N is defined by a numerical progression, and
the numerical progression comprises at least one of a logarithmic progression, an exponential progression, or a geometric progression.

18. The system of claim 15, wherein the storage controller is further configured to:
adjust N in response to detecting a creation of M incremental backups.

19. The system of claim 15, wherein the storage controller is further configured to:
create at least one second synthetic incremental backup from at least two of the plurality of first synthetic incremental backups, wherein
the at least one second synthetic incremental backup is created in response to the creation of the at least two of the plurality of first synthetic incremental backups.

20. The system of claim 15, wherein the storage controller is further configured to:
delete at least one incremental backup of the plurality of first synthetic incremental backups after the creation of a first synthetic incremental backup of the plurality of first synthetic incremental backups, wherein
the at least one incremental backup was used to create the first synthetic incremental backup.

* * * * *